(No Model.)
W. F. HILL & T. H. HULBERT.
Expansion Pulley.
No. 227,358.  Patented May 11, 1880.
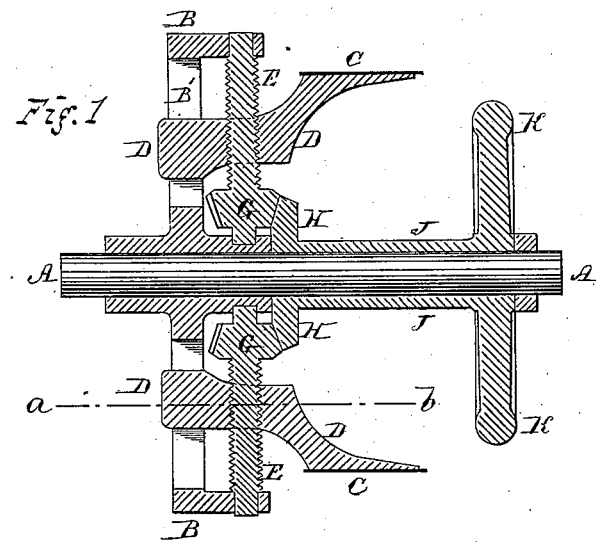
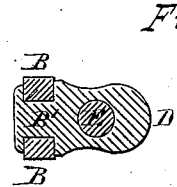
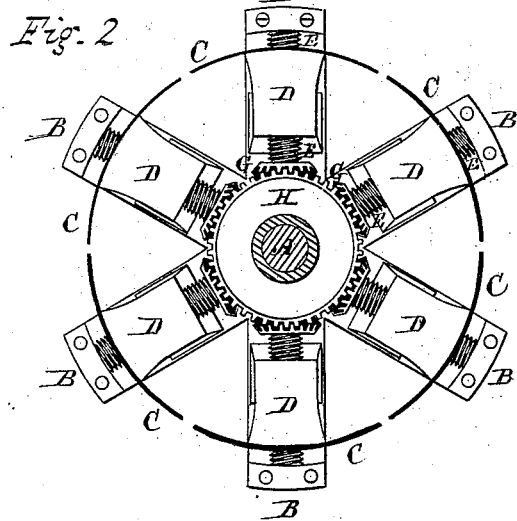
Witnesses
Wendell R. Curtis
Wilmot Horton
Inventor
W. F. Hill & T. H. Hulbert
by Thos. G. Ellis Attorney

United States Patent Office.

WILBER F. HILL AND THOMAS H. HULBERT, OF NORTH MANCHESTER, CONNECTICUT.

EXPANSION-PULLEY.

SPECIFICATION forming part of Letters Patent No. 227,358, dated May 11, 1880.

Application filed March 23, 1880. (No model.)

*To all whom it may concern:*

Be it known that we, WILBER F. HILL and THOMAS H. HULBERT, of North Manchester, in the county of Hartford and State of Connecticut, have invented certain new and useful Improvements in Expansion-Pulleys; and we do hereby declare that the following is a full, clear, and exact description thereof, whereby a person skilled in the art can make and use the same, reference being had to the accompanying drawings, and to the letters of reference marked thereon.

Like letters in the figures indicate the same parts.

Our invention relates to improvements in such pulleys as are used upon shafting to communicate motion from one shaft to another by means of belts, and are adapted to be increased or reduced in diameter so as to give a different speed to the belt.

The object of our invention is to provide a pulley which will admit of a greater range of variation in the diameter and be better adapted for the smaller sizes of pulleys than has heretofore been in use, and also to provide a pulley that can be readily and easily adjusted to transfer motion from one shaft to another with the greatest exactness in the relative speed.

In the accompanying drawings, illustrating our invention, Figure 1 shows a longitudinal section through the middle of our improved pulley when placed upon a shaft. Fig. 2 is a front view of the same with the hand-wheel which operates the expansion removed. Fig. 3 shows a section on the line *a b* of Fig. 1.

A is the shaft upon which the pulley is set. B is the frame of the pulley. It has a central hub, which is keyed to the shaft A, and radial arms which carry the several sections of the expanding pulley.

C C are the sections of the expanding pulley. Each one forms part of the circumference, and they all move out or in simultaneously, as will be described.

D D are the sliding blocks which carry the sections C, to which they are firmly attached. The rear end of the block D slides in and out radially, passing through slots B' in the arms of the frame B. Its sides are furnished with suitable grooves for the purpose.

E E are screw-spindles passing through hollow threads in the blocks D, and having one end turning in a bearing in the central hub and the other turning in a bearing in the end of one of the arms of the frame B, which are furnished with projections at the ends for the purpose. The turning of these screws forces the blocks D out or in.

G G are bevel-gear wheels fixed upon the screws E. They all gear into a bevel-wheel, H, which is attached to or forms part of the sleeve J, turning freely upon the arbor or shaft A.

K is a hand-wheel attached to the sleeve J for the purpose of turning it and operating the screws E.

In our improved expansion-pulley the part which receives the belt C is situated on one side of the expanding mechanism, and can therefore be brought much nearer to the shaft than where the expanding devices are situated within the circumference of the pulley.

The operation of the expanding mechanism is as follows: The shaft A being stationary, when it is desired to contract the size of the pulley the hand-wheel K is turned to the right. This operates through the sleeve and bevel-gears to turn the screws, so as to draw in the sections C and diminish the diameter of the pulley. When it is desired to increase the diameter the hand-wheel is turned to the left. This causes the sections of the pulley to move outward. It is intended to use two such expanding pulleys with the same belt, placed upon the driving and driven shafts, so that one can be diminished as the other is enlarged, and thus keep the belt tight.

Our invention is particularly adapted for machinery where it is required to adjust the speed of the driven shaft with great exactness.

By means of our invention any degree of tension can be given to the belt without relacing. The pulleys can be expanded so as to always keep it tight.

What we claim as our invention is—

1. An expansion-pulley in which the movable sections are placed upon one side of the expanding mechanism, thereby adapting the pulley to be contracted to a smaller diameter than the exterior of the expanding mechanism, substantially as described.

2. The combination of the frame B, the pulley-sections C, situated on one side of the frame B, the blocks D, forming laterally-projecting arms to support the parts C, the screw-spindles E, the gears G H, the sleeve J, and the hand-wheel K, to form an expansion-pulley, substantially as described.

WILBER F. HILL.
     THOMAS H. HULBERT.

Witnesses:
 THEO. G. ELLIS,
 WENDELL R. CURTIS.